United States Patent [19]
Jonsson et al.

[11] 3,949,532
[45] Apr. 13, 1976

[54] SANDWICH-TYPE BUILDING PANEL AND MOUNTING ASSEMBLY THEREFOR

[76] Inventors: Olov Jonsson, Olivedalsgatan 14b, S-413-10 Goteborg; Edward Milaszewski, Framgangen 210-81, S-412-80 Gotenborg, both of Sweden

[22] Filed: Sept. 30, 1974

[21] Appl. No.: 510,739

[30] Foreign Application Priority Data
Sept. 28, 1973 Sweden .............................. 7313214

[52] U.S. Cl. .................... 52/404; 52/79; 52/270; 52/309
[51] Int. Cl.² ...................... E04B 1/74; E04H 9/06
[58] Field of Search ............ 52/270, 238, 243, 404, 52/615, 629, 79, 309, 302; 161/161

[56] References Cited
UNITED STATES PATENTS

| | | | |
|---|---|---|---|
| 2,836,266 | 5/1958 | Leeser | 52/404 X |
| 3,058,551 | 10/1962 | Martin | 52/404 X |

FOREIGN PATENTS OR APPLICATIONS

| | | | |
|---|---|---|---|
| 1,225,750 | 2/1960 | France | 52/404 |
| 623,148 | 7/1961 | Italy | 52/404 |
| 1,121,304 | 1/1962 | Germany | 52/404 |

*Primary Examiner*—J. Karl Bell
*Attorney, Agent, or Firm*—Karl F. Ross; Herbert Dubno

[57] ABSTRACT

A building panel comprising a pair of parallel skins of fireproof and ruptureproof synthetic-resin material sandwiching a foamed synthetic-resin mass is provided at least along its lower edge with a gas-porous body between the skins which defines an empty cavity running the full length of the mass between the skins. A rigid edge stiffener between the skins underneath the mass and the body is formed with throughgoing holes allowing gas under pressure between the skins to escape to the exterior. The edge stiffeners are formed with vertically open bores and the panels so formed are mounted in place by means of rods which are slipped through synthetic-resin tubes imbedded in the slabs above and below the panel. Thus a panel is tipped into place, pivoting upon hinged upper ends of the rods projecting from below, and when in place further rods are dropped down from above into the holes in the upper edge stiffener so as to secure the panel tightly in place.

8 Claims, 4 Drawing Figures

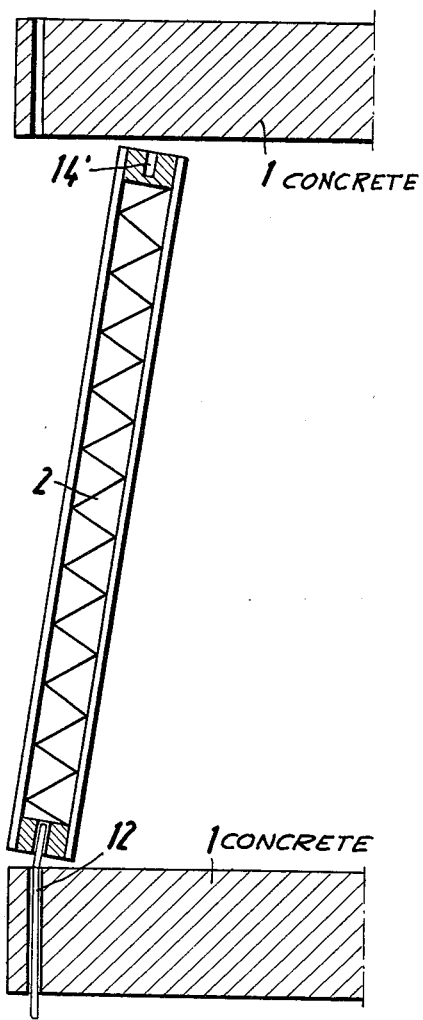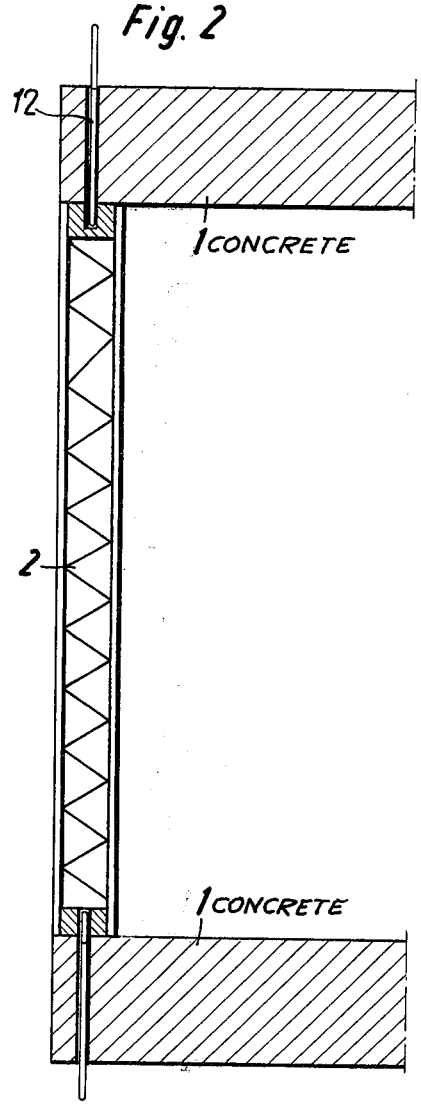

SANDWICH-TYPE BUILDING PANEL AND MOUNTING ASSEMBLY THEREFOR

CROSS-REFERENCE TO RELATED APPLICATION

This application is related to copending application Ser. No. 520,914 filed Nov. 4, 1974 for an EDGE REINFORCEMENT FOR SANDWICH-TYPE BUILDING PANEL.

FIELD OF THE INVENTION

The present invention relates to a building panel. More particularly this invention concerns a sandwich-type panel made principally of synthetic-resin material and usable for exterior and interior walls, floors, and roofs.

BACKGROUND OF THE INVENTION

Sandwich-type building panels are known having a pair of relatively dense skins between which is enclosed a foamed synthetic-resin mass with open and closed cells. The mass can be made of polystyrene, polyurethane, polyisocyanate, polyvinylchloride, and the like. This mass is usually installed as a plate of hard material between the outer skins or is injected therebetween and allowed to foam and harden. It is common practice to stiffen the edges of such panels by means of hard shythetic-resin, wood, or metal edge members.

Such sandwich panels are well known for use in windows and door frames. However, their use on a large scale as construction elements for partition walls and the like in buildings has been impossible. This is due to the fact that such panels are very difficult to anchor securely in place in a conventional building. It is necessary to provide frames to support such panels so that their main advantages are lost in the added construction costs and, indeed, in the often unattractive appearance of such frames.

In addition there is a considerable difficulty with such panels in that they are rapidly destroyed in case of fire. Even when the skins are made of relatively fireproof and rupture-proof material the panel is able to withstand only a small amount of heat before it is completely destroyed. This is due to the fact that the foamed synthetic-resin mass between these skins generates considerable gas when heated. The pressure of this gas builds up between the skins and frequently blows them explosively apart, thereby completely destroying the panel and allowing the fire to pass readily into the next room. Once the fire has reached the foamed mass between the skins the panel is very quickly destroyed. This is particularly true where the core material when molten is flammable as then the entire panel will burst into flames. Thus such panels not only are ineffective for limiting and preventing fires, but frequently in themselves can create a fire hazard. For this reason most building codes completely prohibit the use of such panels on any large scale.

OBJECTS OF THE INVENTION

It is therefore an object of the present invention to provide an improved building panel of the above-described general type and a method of mounting such a panel between a pair of vertically spaced slabs.

Another object is the provision of such a panel which is highly resistant to destruction by heat.

A further object is the provision of an improved construction assembly including such a panel wherein the panel is securely held in place.

SUMMARY OF THE INVENTION

These objects are attained according to the present invention in a building panel comprising a pair of parallel skins of fireproof and ruptureproof synthetic-resin material sandwiching a foamed synthetic-resin mass. A gas-porous body is provided between the skins generally under the mass and defining therewith an empty cavity and a rigid edge stiffener between the skins and generally under the mass and the gas-porous body is formed with a throughgoing passage for gas flow between the cavity and the exterior. In case of fire with such a panel any gas pressure between the skins can be vented readily through the passage in the edge stiffener so that an explosion of the panel due to internal gas pressure is ruled out. In addition if the panel is heated sufficiently to melt the foamed core the melted resin will flow out this hole, leaving the skins intact.

In order to resist horizontal forces against a vertical panel, according to the present invention, this panel is formed at its upper and lower edges with vertically open bores each adapted to receive a respective pin projecting from the overhead or underneath ceiling or floor slab. This pin according to the present invention is provided with a hinge allowing it to be bent in one direction relative to its longitudinal axis. Thus according to the present invention a panel is installed by positioning it at an angle to the floor with a plurality of such pins having their hinged ends engaged in the bores along the bottom edge of the panel. Then the panel is tipped up into a vertical position, pivoting the hinged ends of the pins about their axes until they and the panel are perfectly vertical. Then further such pins are dropped down through the overhead slab into the bores along the top edge of the panel, these latter bores being blind whereas the former bores in the lower edge are throughgoing. In this manner an extremely stable positioning is provided which resists considerable horizontal forces such as are frequently encountered in fires.

According to the present invention the mounting assembly includes a plurality of vertical sleeves embedded in the floor and ceiling slabs and extending vertically completely through the slabs with their upper and lower ends flush with the upper and lower faces of these slabs. Spacer means is provided for holding these sleeves or tubes at a predetermined distance from the edge of the slab so as to ensure perfect alignment of the panels with the edges of the slabs in the finished assembly. This spacer means comprises at least two vertically spaced eyes which have lateral ends that are arranged flush with the outside edge of the respective slab. In addition anchors are provided in the form of large V-shaped reinforcing bars which lie in a horizontal plane and open inwardly of the slabs with the respective tube lying at their apices. Two such anchors are used with each tube so as securely to seat the tubes in the slabs. The steel pins serving to hold the panels in place by fitting in their edge bores are received in these tubes.

In accordance with a further feature of this invention a good seal at the edges of the panels is formed by providing the panels around their edges with a soft material that melts when subjected to the effects of heat. This layer thus melts in case of fire so as to form a tight seal from one side of the panel to the other, while at the same time it allows gas driven from the foam core to escape at these edges from the panel.

The panel according to the present invention can be produced relatively easily and at very low cost by conventional machinery. It can be used in virtually any kind of construction, as its fireproofing capacity is at least as good as that of a conventional building panel.

BRIEF DESCRIPTION OF THE DRAWING

The above and other objects, features, and advantages will become more readily apparent from the following, reference being made to the accompanying drawing in which:

FIGS. 1 and 2 are vertical sections through an assembly according to the present invention illustrating mounting of the panel according to this invention;

SPECIFIC DESCRIPTION

Figure 3:
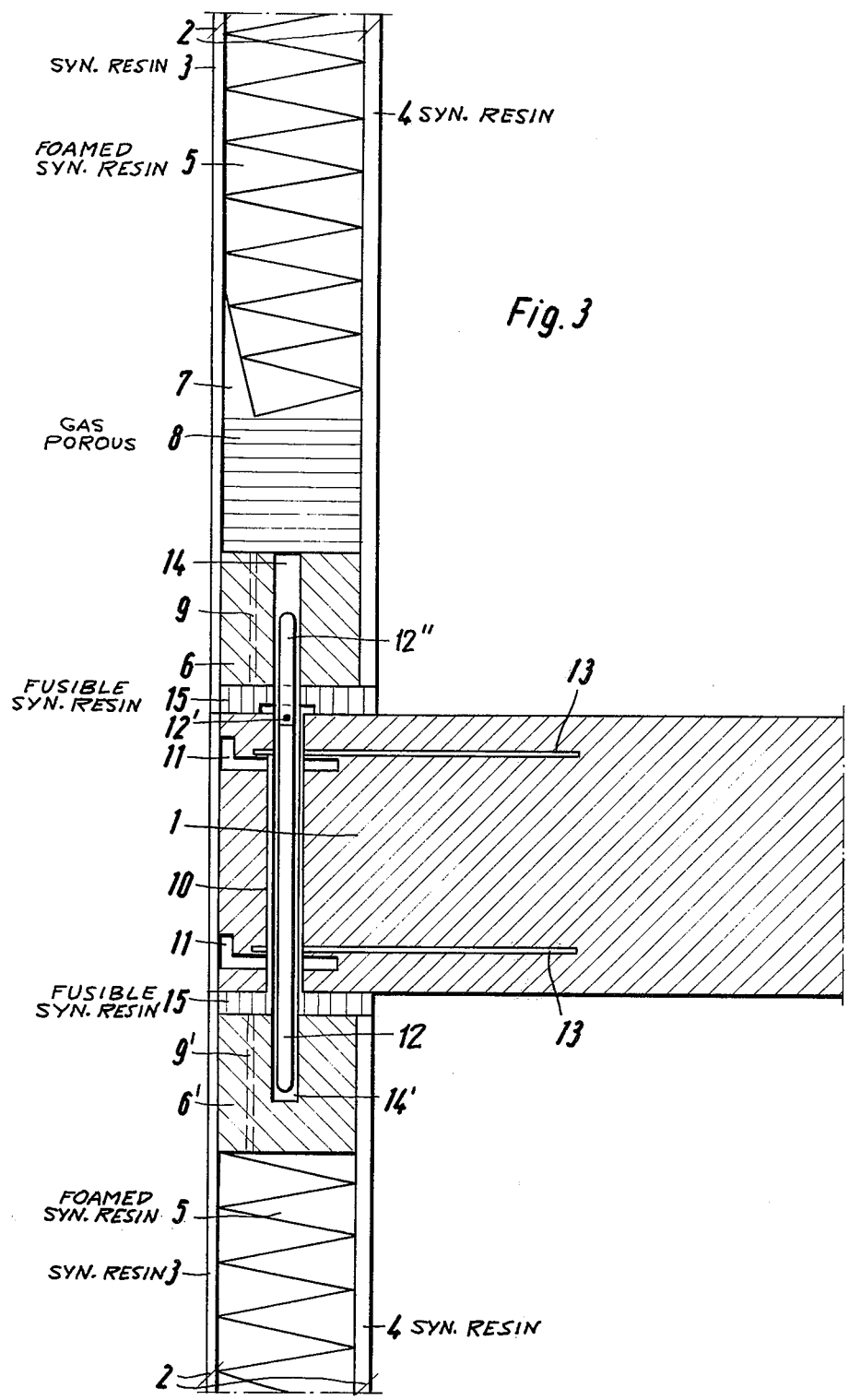
FIG. 3 is a vertical section through a detail of FIG. 2, in enlarged scale.

As shown in FIGS. 1 and 2 a panel 2 is adapted to be positioned between a pair of horizontal reinforced-concrete slabs 1 which are spaced apart by a distance equal to the overall height of the panel 2. This is accomplished as shown in FIGS. 1 and 2 by fitting a plurality of rods 12 into respective holes 14 along the bottom edge of the panels 2 and then tipping the panel into a vertical position (FIG. 2) and dropping a plurality of such pins 12 down from overhead through the upper panel 1 into respective blind bores 14' formed at the upper edge of the panel. To allow tipping of the panel 2 the pins 12 are hinged at 12' so that their upper ends 12'' can bend at this hinge 12'.

As shown in more detail in FIG. 3 each of the panels is formed by a pair of fire and rupture proof synthetic-resin skins 3 and 4 between which is received a mass 5 of polyurethane foam. An empty cavity 7 is formed at the bottom of the mass 5 against the outer skin 3. Below the mass 5 there is provided a gas-porous body 8 extending horizontally along the lower edge of the mass 5 underneath cavity 7. This body 8 is formed of packed glass-fiber material.

Along its lower edge the panel is provided with a rigid edge stiffener 6 formed with the bores 14. Similarly along its upper edge each panel 2 is provided between the skins 3 and 4 with another sheet-metal edge stiffener 6' formed with the blind bores 14'. The edge stiffeners 6 and 6' are formed with respective throughgoing passages 9 and 9' which allow gas pressure from within the panel 2, that is captured between the skins 3 and 4, to be relieved to the exterior. In addition there is provided all around the edge of the panel a synthetic-resin edge strip 15 which melts at a relatively low temperature so that it can serve as a seal between the panel edge and the slab 1 so as to allow the relieving of air pressure in the panels when melted.

Figure 4:
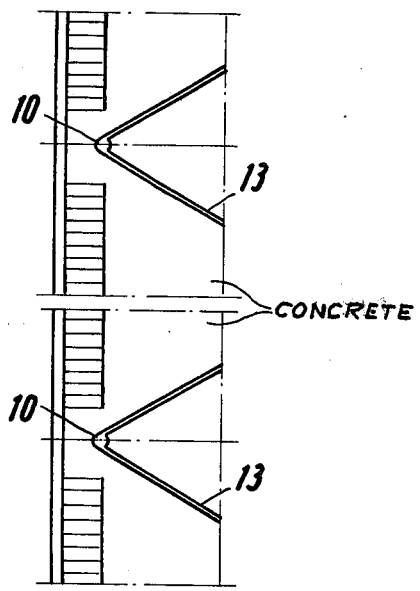
FIG. 4 is a horizontal section through the slab shown in FIG. 3.

Each slab 1 is provided for each of the pins 12 with a respective vertical tube 10 of synthetic-resin material which is held at a predetermined exact spacing from the edge of the slab by means of a pair of eye-spacers 11. In addition (see also FIG. 4) a pair of anchors 13 of generally V-shape are provided so as to prevent the tubes 10 from being pulled laterally out of the slab by horizontal pressures exerted against the respective slabs.

Such an assembly is extremely rigid and can be put together very rapidly. In addition a fire to one side of the partition will be unlikely to spread to the other side as horizontal forces exerted against the partition are easily withstood by the rigid steel pins 12 and any gas generated between the skins 3 and 4 will leak out of the partition rather than causing it to explode and allow the fire to spread.

We claim:

1. A construction assembly comprising:
   a pair of parallel skins of fireproof and rupture-proof synthetic-resin material;
   a foamed synthetic-resin mass between said skins;
   a gas-porous body between said skins generally under said mass and defining therewith an empty cavity between said skins;
   a rigid edge stiffener between said skins generally under said mass and said cavity and formed with a throughgoing passage for gas flow between said cavity and the exterior, whereby said skins, said mass, said body, said stiffener form a building panel; and
   means for securing said building panel in a generally upright position between a pair of vertically spaced slabs, said edge stiffener having a portion extending along the upper edge of said panel and a portion extending along the lower edge of said panel, said portion being formed with outwardly open bores, said means including a plurality of pins extending vertically from said slabs into said bores.

2. the assembly defined in claim 1 wherein said means includes a plurality of vertical sleeves imbedded in each of said slabs, a respective rod slidably received in each of said sleeves, and spacer means for positioning each of said sleeves a predetermined distance from edge of the respective slab.

3. The assembly defined in claim 2 wherein each of said pins is provided with a hinge and an upper end section pivotal at said hinge relative to the respective pins.

4. The assembly defined in claim 2, further comprising anchor means for securing said sleeve in said slab.

5. The assembly defined in claim 4 wherein said anchor means includes a pair of V-shaped bars imbedded over each other in said slabs with their apices receiving a respective sleeve.

6. The assembly defined in claim 1 wherein said bores in said upper stiffener portion are blind bores.

7. The assembly defined in claim 6 wherein said bores in said lower stiffener portion are throughgoing.

8. A construction assembly comprising:
   a pair of parallel skins of fireproof and ruptureproof synthetic-resin material;
   a foamed synthetic-resin mass between said skins;
   a gas-porous body between said skins generally under said mass and defining therewith an empty cavity between said skins;
   a rigid edge stiffener between said skins generally under said mass and said cavity and formed with a throughgoing passage for gas flow between said cavity and the exterior, whereby said skins, said mass, said body, said stiffener form a building panel;
   means for securing said building panel in a generally upright position between a pair of vertically spaced slabs; and
   a strip of material having a lower melting temperature than said mass lying between said panel and said slabs.

* * * * *